United States Patent [19]

Keohan

[11] 4,253,571
[45] Mar. 3, 1981

[54] DISC CONTAINER

[75] Inventor: Richard J. Keohan, Braintree, Mass.

[73] Assignee: Nashua Corporation, Nashua, N.H.

[21] Appl. No.: 79,466

[22] Filed: Sep. 27, 1979

[51] Int. Cl.³ .................................................. B65D 85/30
[52] U.S. Cl. .................................... 206/444; 206/303;
206/309; 206/445; 211/40; 312/10
[58] Field of Search ............... 206/303, 445, 444, 309;
24/40, 58, 49 R, 49 S; 312/10

[56] References Cited

U.S. PATENT DOCUMENTS

| 905,578 | 12/1908 | Read .................................... 211/49 R |
| 2,546,470 | 3/1951 | Mueller . |
| 2,670,261 | 2/1954 | Mueller . |
| 2,688,490 | 9/1954 | Schumaker . |
| 3,027,012 | 3/1962 | Talmadge .............................. 211/40 |
| 3,454,316 | 7/1969 | Simmon et al. . |
| 3,494,459 | 2/1970 | Wallestad . |
| 3,505,006 | 4/1970 | White . |
| 3,598,401 | 8/1971 | Snellman . |
| 3,670,878 | 6/1972 | Seiler . |
| 3,736,777 | 6/1973 | Wirth . |
| 3,804,311 | 4/1974 | Oglesbee .............................. 206/445 |
| 3,819,847 | 6/1974 | Charles . |
| 4,084,690 | 4/1978 | Pulse . |
| 4,118,081 | 10/1978 | Barrientos . |
| 4,162,006 | 7/1979 | Wilson . |
| 4,195,733 | 4/1980 | Abel ..................................... 206/444 |

FOREIGN PATENT DOCUMENTS 673385 11/1963 Canada ........................................ 211/40

Primary Examiner—Joseph Man-Fu Moy
Attorney, Agent, or Firm—Kenway and Jenney

[57] ABSTRACT

A container for disc storage and transportation includes nestable spacers with disc supporting and locating rims. Vertical posts with a plurality of vertically spaced slots rise through the central opening of the spacers and are engageable by the cross bar of the spacer when the spacer is roatably twisted. Each slot has a downwardly facing inclined surface for urging the engaged spacers downward.

8 Claims, 9 Drawing Figures

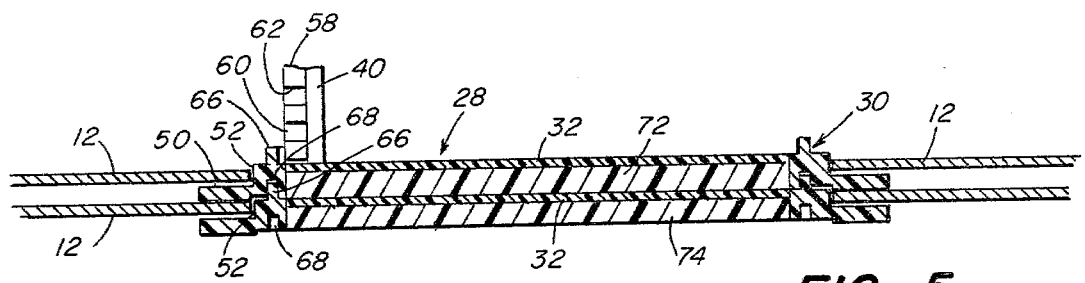
FIG. 5
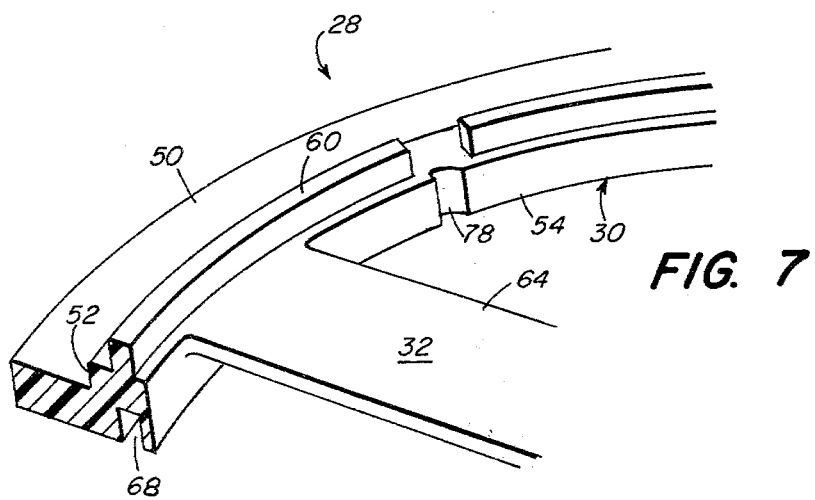
FIG. 7
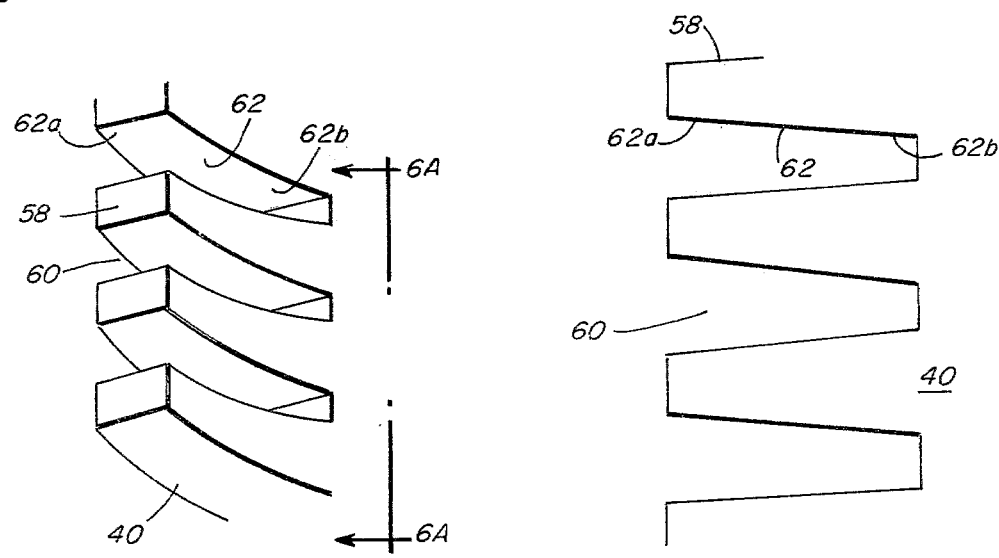
FIG. 6
FIG. 6A

DISC CONTAINER

BACKGROUND OF THE INVENTION

This invention relates to containers for transporting and storing discs in a secured, spaced apart arrangement, and particularly to the disc stacking assembly of such a container.

Many modern electronic devices use discs for the storage of data. Computer magnetic discs and television video recorder discs are two common examples. The transportation and storage of these discs is an important aspect of their use, and present certain problems. Though the discs obviously lend themselves to stacking, placing the discs one on top of the other is not feasible because the chance of damage to the disc surfaces is too great.

Typically, then, the discs are stacked for transportation and storage in a spaced apart arrangement, with spacers between them to keep them spaced apart. Often the spacers are used in cooperation with a spindle or post to secure the stack in a container, and are locked in place in some manner or other, as by a pin passing through stack elements. A sealable container usually encloses the stacking assembly to keep dust and dirt off the disc surfaces.

Though the reliability and effectiveness of such disc storage and transportation containers are important, it is also important to be able to purchase or manufacture the containers cheaply, since the containers are, after all, only peripheral items of equipment.

It is therefore an object of the invention to produce a reliable and effective assembly for stacking discs in a spaced apart arrangement for damage-free storage and transportation. It is also an object to produce such an assembly that is inexpensive to manufacture. Another object is to produce a disc storage container that is easy to use and positive in its securing of the discs stacked within it.

SUMMARY OF THE INVENTION

A vertical post rises from a horizontal base in a section of a disc container, and a spacer for stacking discs in a spaced arrangement has a horizontal edge that engages a horizontal slot in the post when the spacer is rotated about a vertical axis. A locking device maintains the spacer or spacers in the engaged position.

In preferred embodiments there are two or more posts, each having a plurality of horizontal slots, vertically spaced apart. The spacers nest, and each has a circular rim portion for supporting and locating a disc, and a central bar portion joining opposite interior edges of the circular portion, which has horizontal edges that engage the posts simultaneously when the spacer is twisted. The upper portions of the post slots are defined by inclined, downwardly facing surfaces that urge the spacers toward the base when the spacers engage the slots while being rotated.

BRIEF DESCRIPTION OF THE DRAWING

Other objects, features and advantages of the invention will be apparent from the following description of a preferred embodiment, including the drawings thereof, in which:

FIG. 5 is a sectional view of a portion of a stack of discs, showing two discs and two spacers taken along a vertical plane passing through the center of the assembly;

FIG. 6 is a detailed perspective view, from the bottom, of a portion of the edge of one of the vertical posts shown in FIG. 1;

FIG. 6A is a detailed side elevational view of the vertical post portion, along the line 6A—6A of FIG. 6;

FIG. 7 is a detailed perspective view of a portion of a spacer, showing particularly the notch in the inside edge of the spacer rim.

DESCRIPTION OF A PREFERRED EMBODIMENT

Figure 1:
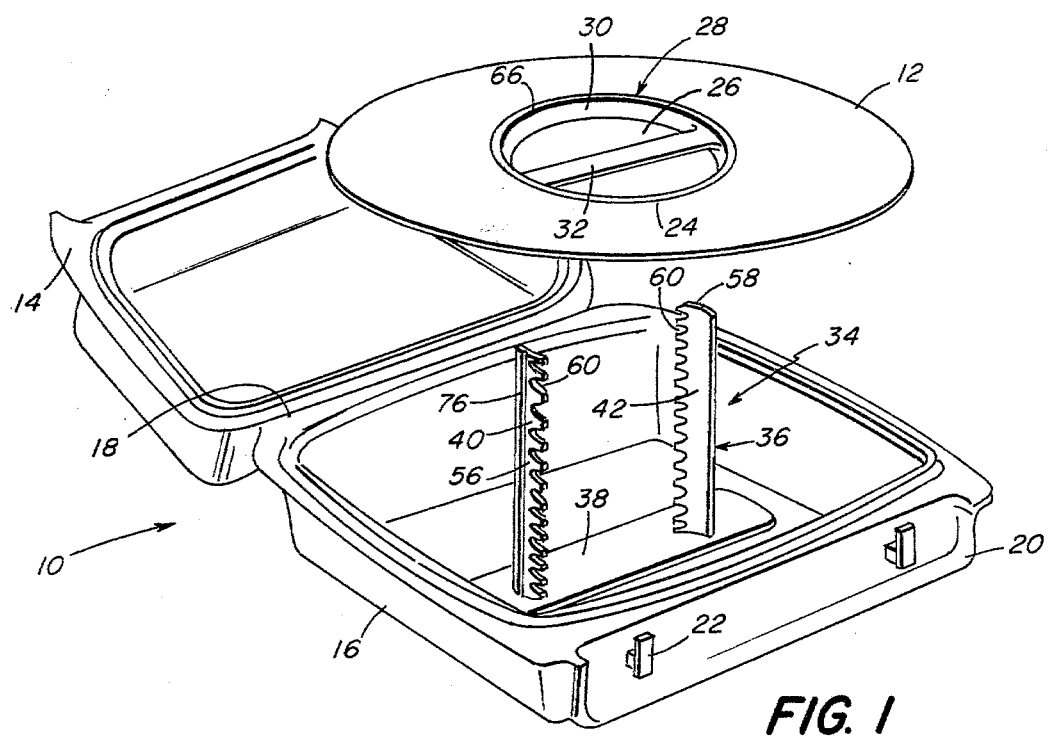
FIG. 1 is a perspective view of an open magnetic disc storage container having a disc stacking assembly according to the invention.

A container 10 for transporting and storing magnetic discs 12 is shown in FIG. 1. The container 10 includes plastic molded top 14 and bottom 16 sections connected by an integrally molded hinge portion 18. The molded container 10 includes, in the illustrated embodiment, portions molded to form a handle 20 by which the closed container 10 can be carried. It also includes latches 22 for keeping the container 10 closed.

As seen in FIG. 1, the magnetic disc 12, a flat metallic disc coated with a suitable material for information storage, has an inside circular edge 24 defining an interior opening 26. A spacer 28 made of a resilient plastic material and having a circular rim 30 joined by a cross bar 32 is shown in cooperation with the disc 12 in FIG. 1.

The bottom section 16 of the container includes a lower portion 34 of a disc stacking assembly 36, including a horizontal base 38 secured to the bottom section and, rising from the base, two vertical posts 40, 42.

Figure 2:
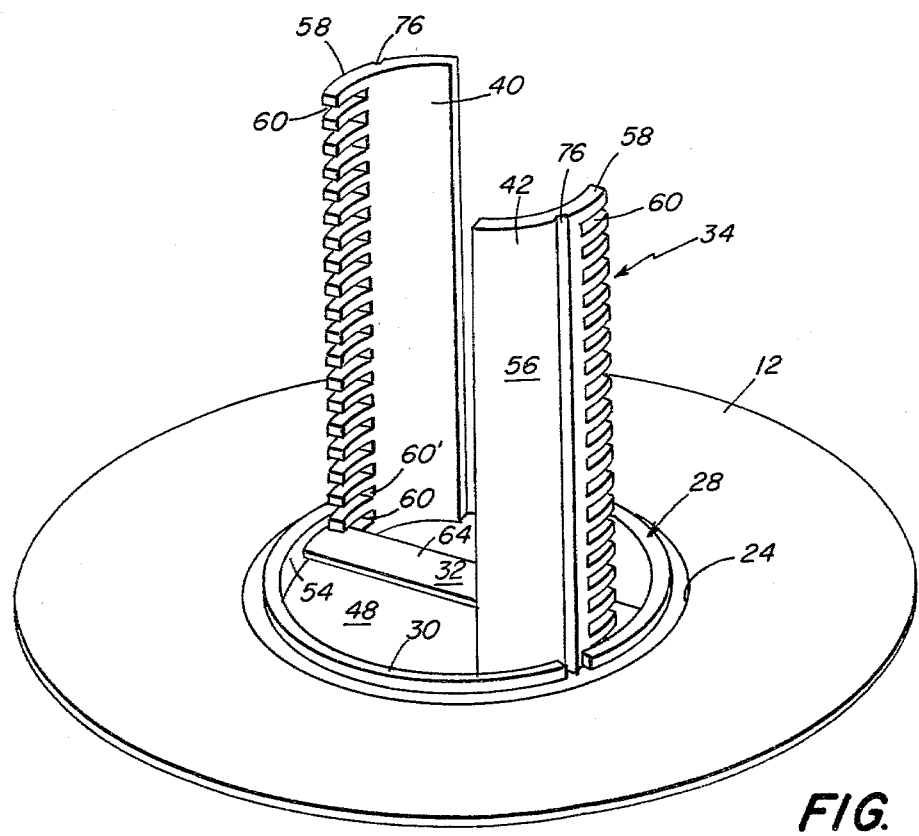
FIG. 2 is a detailed perspective view of a magnetic disc supported by a spacer in the assembly of FIG. 1.

FIG. 2 shows the disc 12 and spacer 28 in cooperation with the stacking assembly lower portion 34. The vertical posts 40, 42 extend through a central opening 48 defined by the spacer rim 30. The magnetic disc 12 is supported by a horizontal circular shelf 50 of the spacer rim 30, and is located thereon by a circular vertical wall 52 extending upwardly from the shelf inside the disc inside edge 24.

The vertical posts 40 and 42 are located 180° apart, each located just inside an adjacent portion of the inside edge 54 of the spacer rim 30. Each post 40, 42 has a curved outside surface 56 with a radius of curvature smaller than that of the adjacent spacer rim edge 54. Each post 40, 42 has a vertical edge 58 defining a plurality of horizontal slots 60, vertically spaced apart. Each slot 60 is defined in part by a downwardly facing upper surface 62, slightly inclined downwardly away from a portion 62a near the edge of slot 60 toward a portion 62b at the interior of slot 60. (See FIGS. 6 and 6A.) The slots 60 of the posts 40, 42 are arranged so that the horizontal edges 64 of the cross bar 32 of a spacer 28 engages the slots of the posts simultaneously as the spacer 28 is rotated about a vertical axis. The downwardly inclined surfaces 62 of the slots 60 engaged by the cross bar horizontal edges 64 exert a camming action on the spacer cross bar 32 urging the spacer 28 toward the container base plate 38.

Figure 3:
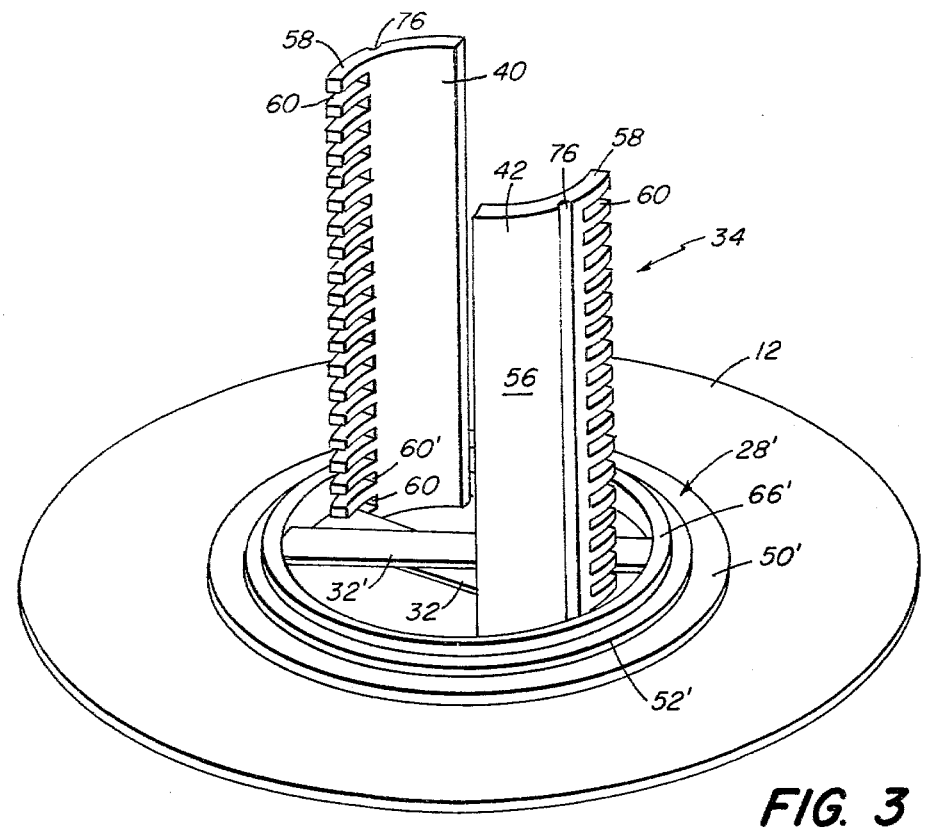
FIG. 3 is a view like FIG. 2 with another spacer placed above the magnetic disc, the added spacer not engaged with vertical posts of the assembly.

FIG. 3 shows another spacer 28' added to the assembly of FIG. 2. Each spacer 28 has a vertical circular wall 66 extending upwardly from the spacer rim 30 and a corresponding lower circular groove 68, so that stacked spacers 28 have a nesting relationship (see FIG. 5) that allows relative rotational movement between the stacked spacers. A vertical strengthening rib 74 extends below each spacer cross bar 32.

Figure 4:
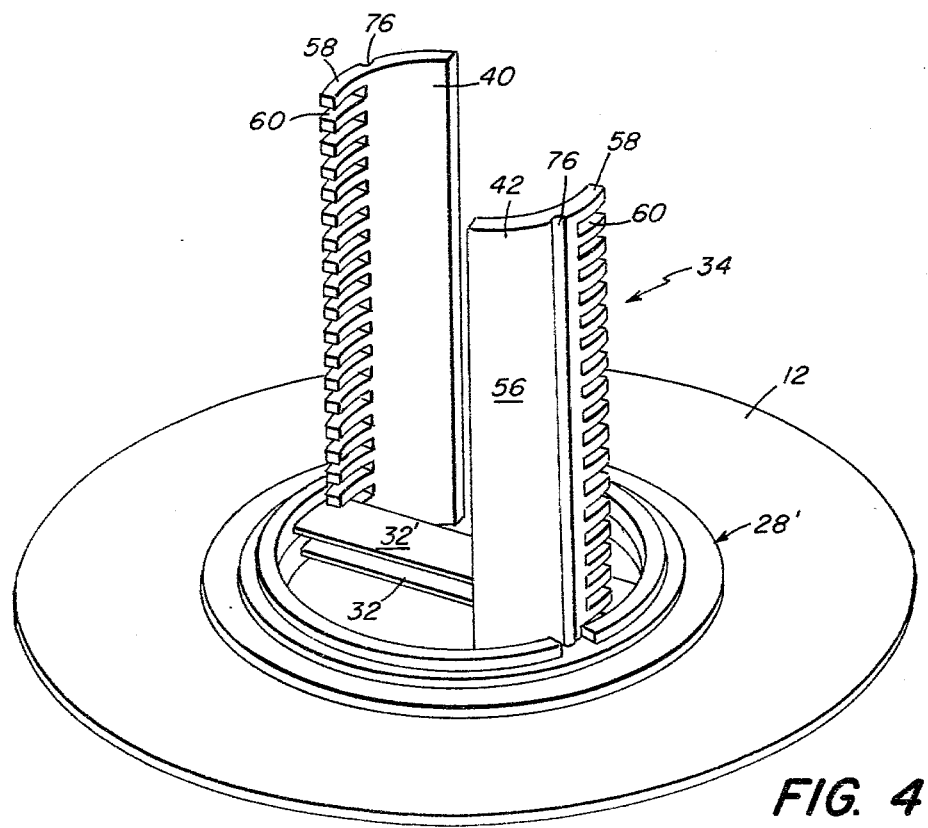
FIG. 4 is a view like FIG. 2, with the added spacer rotated to engage the vertical posts.

In FIG. 3 an added spacer 28' is shown with the cross bar 32' out of engagement with the slots 60 of the vertical posts 40, 42. In FIG. 4, the spacer 28' is shown after it has been rotated about a vertical axis to horizontally, slidingly engage the slots 60' of the two posts 40, 42 next above the slots 60 engaged by the lower spacer 28. The camming effect of the slot's upper surface 62' urges spacer 28' down toward the base 38, tightening the nesting relationship between the upper spacer 28' and the lower 28.

Figure 8:
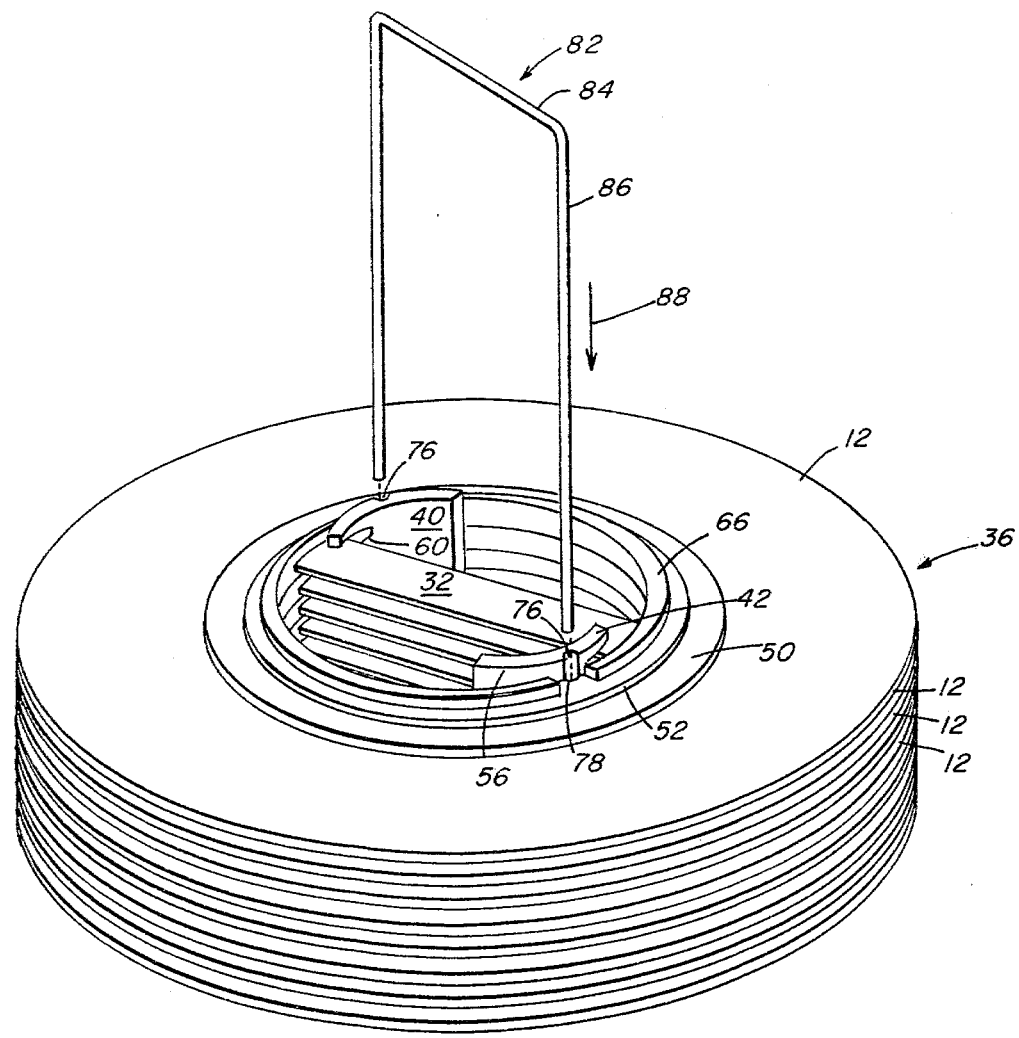
FIG. 8 is a perspective view of the top of an assembled stack of discs, showing a clip being inserted to lock the spacers into position.

Each of the vertical posts 40, 42 has a vertical groove 76 generally semicircular in cross-section, in its outside surface 56, circumferentially spaced from its slotted vertical edge 58. Each of the spacers 28 has two corresponding vertical notches 78 in the inside edge 54 of the spacer rim 30. The notches 78 are arranged so that when the spacers 28 are in full engagement with the post slots 60, the notches of stacked spacers are aligned with each other and also face the groove 76. A U-shaped locking clip 82 (see FIG. 8) is used to secure the spacers 28 into slot-engaging positions. The clip 82 has a central portion 84 joining two downwardly extending legs 86 made of a wire of suitable size cross section to be inserted in the direction shown by the arrow 88 down the post groove 76 and aligned spacer notches 78 to prevent rotational movement of the spacers 28.

To use the container 10 and the stacking assembly 36, then, spacers 28 and discs 12 are alternately placed in the bottom portion 16 of the opened container 10. The vertical posts 40, 42 guide the placement of a spacer 28. A rotational twist of a spacer 28 causes the horizontal edges 64 of the spacer cross bar 32 to slidingly engage the slots 60 of the two vertical posts simultaneously. The camming action of the downwardly facing inclined surfaces 62 urges the spacer 28 toward the base 38 and a firm nesting relationship with the spacers 28 below it.

Each engaged spacer 28 offers a spacer rim shelf 50 for support of a magnetic disc 12 which is lowered onto the spacer. The spacer vertical wall 52 centrally locates the disc 12. After the placement of a disc 12, another spacer 28 is added to the assembly 38 and twisted to engage the posts 40, 42, and so on. After the desired number of spacers 28 and discs 12 are stacked, the locking clip 82 is inserted to prevent disengaging rotational movement of the spacers 28. The locked spacers 28 thereby form a solid cylindrical core with disc receiving, supporting and locking capability, holding the stacked discs 12 in a spaced apart relationship that avoids damaging contact between them.

Closing the container 10 places the top portion 14 of the container over the top of the clip 82, preventing the clip's disengagement from the assembly 36. Closing the latches 22 closes the container 10. The container can then be grasped by the handle 20 and carried. the omnidirectional securing of the discs 12 by the assembly 36 allows storage of the container in any position.

The advantages of the invention lie in the swift and sure manner in which the disc stack assembly 36 can be put together and the sturdiness of the assembly after it is put together. The alignment of the spacers 28 is easily checked visually by noting the alignment of the spacer notches 78 and the post grooves 76. The camming action of the post inclined surfaces 62 hold the spacers 28 in aligned position until the clip 82 is inserted to lock the spacers 28 in place. The toothed posts 40, 42 that permit such a convenient assembly are easily and cheaply manufactured.

Modifications of the illustrated embodiment will occur to those skilled in the art. The number of vertical posts may be varied. The size of the assembly and various elements in it may be changed to suit the dimensions and configurations of the kind of disc to be stacked in the container. And the assembly need not be used only for stacks of discs. A modified arrangement suitable for the storage and transportation of a single disc is feasible using the technique and elements described above. Other modification, deletions, and additions to the illustrated embodiment may be produced and are considered to be within the scope of the invention, as set forth in the following claims.

I claim:

1. An assembly for supporting, locating and stacking one or more discs in a spaced apart relationship comprising:
   a horizontal base,
   at least one vertical post rising from said base,
      said post having an edge portion defining at least one substantially horizontally extending slot,
   at least one spacer having a rim portion for supporting and positioning one of said discs, adapted to be rotatable about a vertical axis while supporting and positioning said disc,
      said rim portion including a horizontally extending edge portion for rotatably, slidingly, horizontally engaging said post slot, and
   locking means for maintaining said spacer in a slot engaging position.

2. An assembly as claimed in claim 1 wherein said post has a vertical edge portion defining a plurality of horizontally extending slots spaced apart in the vertical direction.

3. An assembly as claimed in claim 1 wherein there are at least two said vertical posts,
   each said spacer having a number of horizontally extending edge portions equal to the number of said posts for engaging slots in said posts simultaneously.

4. An assembly as claimed in claim 1 wherein said post edge portion defining said slot includes a downwardly facing inclined surface for urging said spacer toward said base when said spacer is in said plot engaging position.

5. An assembly as claimed in claim 1 wherein said spacer rim portion includes a circular disc supporting and locating portion surrounding a central opening, said vertical post extending through said opening.

6. An assembly as claimed in claim 5 wherein said spacer includes a central bar portion extending between parts of said circular portion, said central bar portion comprising said spacer horizontally extending edge portion for engaging said post plot.

7. An assembly as claimed in claim 1 wherein at least some of said spacers have upper and lower surfaces adapted to allow said spacers to form a nesting relationship.

8. A transfer and storage container for stacking discs in a spaced apart arrangement comprising:

top and bottom hingedly connected sections for enclosing said stacked discs, sealing means for sealing the interior of said container when said top and bottom sections are closed, and a disc stacking assembly in said bottom section, including a horizontal base, vertical posts rising from said base, and spacers cooperating with said posts for supporting and positioning said discs in a spaced apart, secured arrangement and means for locking said spacers in position, wherein the improvement comprises:

each said post having a vertical edge portion defining a plurality of substantially horizontally extending slots vertically spaced apart, including downwardly facing inclined surfaces defining the upper portions of said slots, each said spacer being adapted to be rotatable about a vertical axis while supporting and positioning said discs, said spacer including:

a circular rim portion for supporting and locating said discs, and defining a central opening through which said vertical posts extend, a bar portion joining opposite interior edges of said circular rim portion, said bar portion including horizontally extending portions for rotatably, slidingly, horizontally, engaging said slots of said posts simultaneously, said bar horizontally extending portions engaging said inclined surfaces whereby said spacer is urged toward said base.

* * * * *